(12) United States Patent
Schindler et al.

(10) Patent No.: US 12,061,295 B2
(45) Date of Patent: Aug. 13, 2024

(54) METHOD FOR CALIBRATING A CAMERA AND/OR A LIDAR SENSOR OF A VEHICLE OR A ROBOT

(71) Applicant: MERCEDES-BENZ GROUP AG, Stuttgart (DE)

(72) Inventors: Philipp Schindler, Karlsruhe (DE); Alexander Braun, Ditzingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 82 days.

(21) Appl. No.: 17/796,319

(22) PCT Filed: Dec. 14, 2020

(86) PCT No.: PCT/EP2020/085898
§ 371 (c)(1),
(2) Date: Jul. 29, 2022

(87) PCT Pub. No.: WO2021/151572
PCT Pub. Date: Aug. 5, 2021

(65) Prior Publication Data
US 2023/0082700 A1      Mar. 16, 2023

(30) Foreign Application Priority Data

Jan. 31, 2020   (DE) .................... 10 2020 102 466.5

(51) Int. Cl.
*G01S 7/497*       (2006.01)
*G01S 7/481*       (2006.01)
(Continued)

(52) U.S. Cl.
CPC ............ *G01S 7/497* (2013.01); *G01S 7/4817* (2013.01); *G01S 17/86* (2020.01); *G01S 17/931* (2020.01); *G06T 7/80* (2017.01); *H04N 23/667* (2023.01)

(58) Field of Classification Search
None
See application file for complete search history.

(56) References Cited

U.S. PATENT DOCUMENTS

2009/0059011 A1 * 3/2009 Sun ..................... A61B 1/0605
348/187

FOREIGN PATENT DOCUMENTS

DE      102015008551 A1    1/2016
DE      102016009327 A1 *  2/2017  ............. H04N 5/232
(Continued)

OTHER PUBLICATIONS

International Search Report mailed Mar. 31, 2021 in related/corresponding International Application No. PCT/EP2020/085898.
(Continued)

*Primary Examiner* — Heather R Jones
(74) *Attorney, Agent, or Firm* — PATENT PORTFOLIO BUILDERS PLLC

(57) ABSTRACT

Calibrating a camera and/or a lidar sensor of a vehicle or a robot involves a camera capturing images of a vehicle or robot environment. The lidar sensor emits a real pattern into the vehicle or robot environment in at least one portion of a detection range of the camera, and the real pattern is captured by the camera. A virtual pattern generated in a coordinate system of the lidar sensor is projected onto a virtual plane in the vehicle or robot environment by the lidar sensor. Laser radiation emitted by the lidar sensor penetrates the virtual plane and the real pattern correlating with the virtual pattern is generated on a real projection surface. The real pattern captured by the camera is recalculated onto the virtual plane based on a surface profile of the real projection surface. A rectified virtual pattern is generated in a coordi- (Continued)

Figure 1:
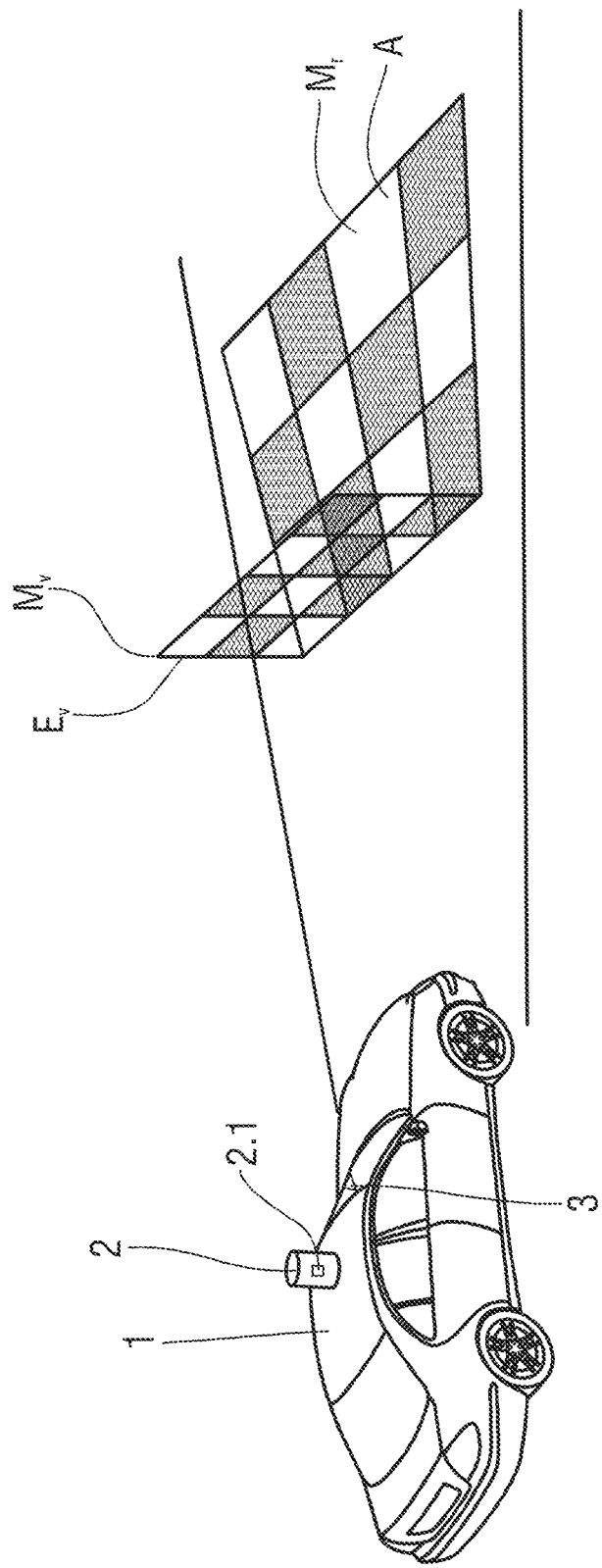

nate system of the camera and the camera and/or lidar sensor is/are calibrated by comparing the virtual pattern and the rectified virtual pattern.

10 Claims, 2 Drawing Sheets

(51) Int. Cl.
*G01S 17/86* (2020.01)
*G01S 17/931* (2020.01)
*G06T 7/80* (2017.01)
*H04N 23/667* (2023.01)

(56) References Cited

FOREIGN PATENT DOCUMENTS

DE  102016009327 A1  2/2017
DE  102019000438 A1  6/2019

OTHER PUBLICATIONS

Office Action created Nov. 6, 2020 in related/corresponding DE Application No. 10 2020 102 466.5.
Written Opinion mailed Mar. 31, 2021 in related/corresponding International Application No. PCT/EP2020/085898.
Yang et al.; "A Simple and Effective Extrinsic Calibration Method of a Camera and a Single Line Scanning Lidar;" 21st International Conference on Pattern Recognition (ICPR 2012); Nov. 11-15, 2012; Tsukuba, JP.

\* cited by examiner

METHOD FOR CALIBRATING A CAMERA AND/OR A LIDAR SENSOR OF A VEHICLE OR A ROBOT

BACKGROUND AND SUMMARY OF THE INVENTION

Exemplary embodiments of the invention relate to a method for calibrating a camera and/or a lidar sensor of a vehicle or a robot.

A method for calibrating a camera of a vehicle is known from DE 10 2016 009 327 A1, wherein images of a vehicle environment are captured by means of the camera. By means of at least one lidar sensor, a defined pattern is emitted into the vehicle environment in at least one portion of a detection range of the camera, which is captured by means of the camera. By means of an evaluation unit coupled with the camera or integrated into it, distance values are determined for the pattern contained in the images captured by the camera, and the calibration of the camera is carried out based on the distance values. The lidar sensor is designed as self-calibrating, wherein the self-calibration is based on an object tracking.

Exemplary embodiments of the invention are directed to a method, which is improved compared to the prior art, for calibrating a camera and/or a lidar sensor of a vehicle or a robot.

In a method for calibrating a camera and/or a lidar sensor of a vehicle or a robot, images of a vehicle environment or robot environment are captured by means of the camera. By means of at least one lidar sensor, a real pattern is emitted into the vehicle environment or robot environment in at least one portion of a detection range of the camera, wherein the real pattern is captured by means of the camera.

According to the invention, a virtual pattern generated in a coordinate system of the lidar sensor is projected onto a virtual plane in the vehicle environment or robot environment by means of the lidar sensor. Here, laser radiation emitted by the lidar sensor penetrates the virtual plane and the real pattern correlating with the virtual pattern is generated on a real projection surface. The real pattern captured by the camera is recalculated onto the virtual plane based on a surface profile of the real projection surface. From this, a rectified virtual pattern is generated in a coordinate system of the camera and the camera and/or lidar sensor is/are calibrated by comparing the virtual pattern and the rectified virtual pattern.

Optical distortions may occur in images captured by cameras due to a lens system and due to potential occlusions of the camera. To avoid the occurrence of such optical distortions, a camera is usually calibrated in a vehicle shop floor or robot shop floor, for example based on a chessboard pattern. Correction values determined in the process are saved. However, these correction values can be impaired in terms of their correctness by ageing of components, different temperature ranges, as well as external mechanical influences.

The method enables calibration of the camera on almost any target, so that the calibration in the production process of the vehicle or robot, for example at the end of the production process, can be simplified. Furthermore, the calibration can also be performed during an operation of the vehicle or robot, for example during short breaks in operation. This also enables a calibration option over a period of operation of the camera in order to also capture ageing effects. This means that calibration can also be carried out and repeated during operation of one of the cameras and of the lidar sensor, which is also particularly advantageous for vehicles that are operated in an automated, in particular highly automated, autonomous or semi-autonomous manner. Also, several calibrations can be combined in one step. The result of taking the calibration into account is that the camera and the lidar sensor see the same object at the same location.

For example, the robots are also designed as a vehicle, for example as a highly or fully automated passenger car, as a highly or fully automated transport vehicle or as a highly or fully automated truck. Also, the robots may be industrial robots, automated lawn mowers, vacuum robots, mopping robots or automated watercraft.

In a possible embodiment of the method, the surface profile of the real projection surface is determined based on distances to pixels of the real pattern determined by means of the lidar sensor. This enables a calibration of the camera and/or the lidar sensor, in particular in a so-called cross calibration, in which reflections of the lidar sensor are registered in the camera and used for a relative calibration of the camera to the lidar sensor, i.e., an error between camera and lidar sensor. Based on the detected lidar reflections in the camera, a virtual pattern on any object in the vicinity of the vehicle or robot can be specified, which is measured three-dimensionally by the lidar sensor so that a so-called ground truth can be generated. The calibration of the camera and the lidar sensor relative to one another enables objects captured by means of the camera and the lidar sensor to be better matched to one another and accuracy increases. If the camera and the lidar sensor are calibrated directly to one another, a relative error between them is reduced. Thus, by directly calibrating the camera to the lidar sensor and vice versa, a direct fusion of raw data from the camera and the lidar sensor can be performed. Furthermore, the fusion of independent data of the camera and the lidar sensor is also improved.

In a further possible embodiment of the method, in the comparison of the virtual pattern and the rectified virtual pattern, at least one transformation equation for converting the virtual pattern into the rectified virtual pattern and/or the rectified virtual pattern into the virtual pattern is determined. This means that transformation parameters are calculated using the two virtual patterns to transform one virtual pattern into the other. The transformation parameters can be used to transform environmental data determined by one of the sensor arrangements, i.e., the camera or the lidar sensor, into the coordinate system of the other sensor arrangement.

In a further possible embodiment of the method, an azimuth error and/or elevation error of the camera and/or the lidar sensor is/are determined in the calibration. Thus, the camera can be calibrated relative to the lidar sensor in such a way that any differences between the optical axes of the camera and the lidar sensor, i.e., azimuth and elevation errors, can be compensated for. Thus, a shift and a rotation of the coordinate system of the lidar sensor relative to the coordinate system of the camera can be determined, which result from the azimuth and elevation error. This shift and rotation are taken into account when comparing the two virtual patterns, which are also shifted and rotated against one another. Thus, a particularly accurate calibration can be performed.

In a further possible embodiment of the method, the laser radiation emitted by the lidar sensor is deflected to generate the virtual pattern by means of a rotating mirror of the lidar sensor. Thus, the virtual pattern in the virtual plane and the real pattern can be generated particularly easily and reliably.

In a further possible embodiment of the method, an integration is carried out across several successively captured images of the camera upon capturing the real pattern by means of the camera. This integration increases a resolution of the camera in the infrared range, which is advantageous because a camera designed as a conventional color camera is most highly sensitive in the visible light range and, in contrast, has rather low sensitivity in the infrared range. Furthermore, synchronization fluctuations of the rotating mirror can lead to varying distances between lines of the virtual pattern and thus the distances between lines of the real pattern. The integration across several successively captured images of the camera enables a compensation of these errors.

In a further possible embodiment of the method, the camera is switched to a calibration mode for calibration.

In a further possible embodiment of the method, the virtual pattern is generated by means of infrared laser radiation so that capture by means of the camera is possible.

In a further possible embodiment of the method, in order to generate images captured by the camera, light radiation hitting the camera is filtered by means of a camera-internal infrared light filter. The infrared light filter reduces interference and increases color quality.

In a further possible embodiment of the method, an infrared light filter is used, which is transparent to infrared laser radiation emitted by the lidar sensor and reflected by the real projection surface, so that capture of the real pattern is possible.

In a further possible embodiment of the method, the infrared light filter is switched to be transparent in a calibration mode of the camera for infrared laser radiation emitted by the lidar sensor and reflected by the real projection surface. Thus, the infrared light filter can be used during normal operation of the camera to reduce interference and increase color quality, and can be deactivated in calibration mode for optimized capture of the infrared laser radiation emitted by the lidar sensor and reflected by the projection surface.

Exemplary embodiments of the invention are explained in more detail below by means of drawings.

BRIEF DESCRIPTION OF THE DRAWING FIGURES

Here are shown:

FIG. 1 in diagram form, a perspective view of a vehicle, a virtual pattern and a real pattern.

Figure 2:
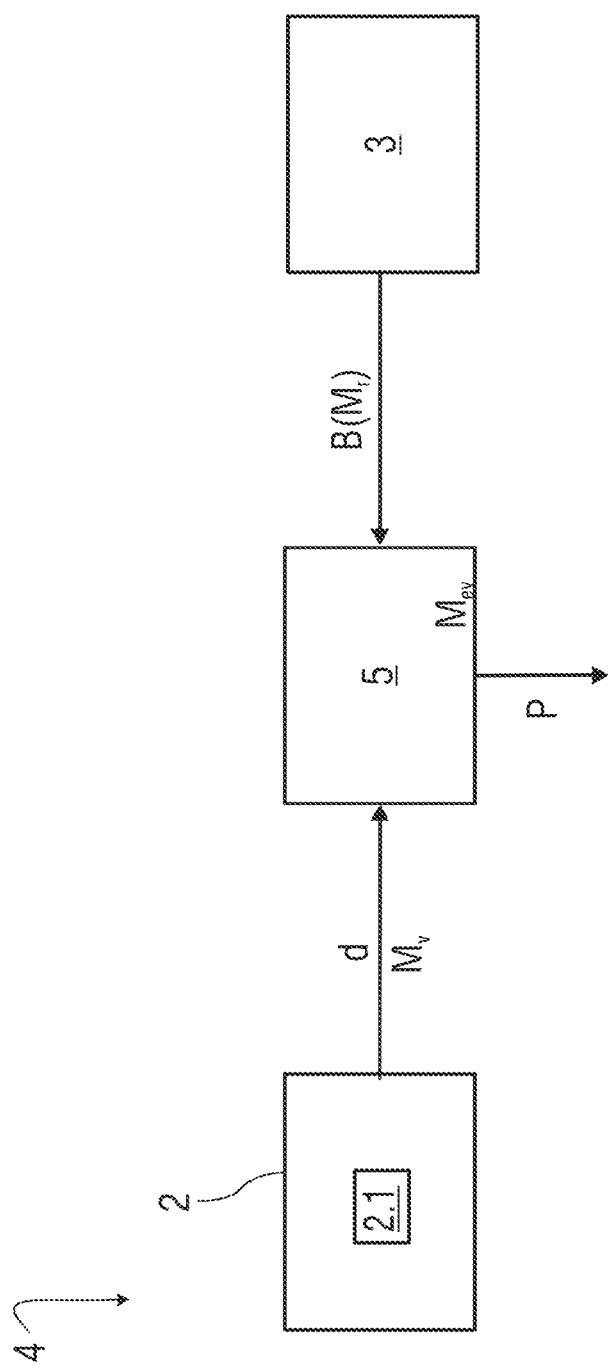

FIG. 2 in diagram form, a block diagram of a device for calibrating a camera and/or a lidar sensor of a vehicle.

Corresponding parts are provided with the same reference numerals in all figures.

DETAILED DESCRIPTION

FIG. 1 shows a perspective view of a vehicle 1, a virtual pattern $M_v$ and a real pattern $M_r$. FIG. 2 shows a block diagram of a possible exemplary embodiment of a device 4 for calibrating a camera 3 and/or a lidar sensor 2.1 of the vehicle 1.

The following statements are also analogously applicable to robots that comprise at least one camera 3 and/or at least one lidar sensor 2.1. Such robots are, for example, also designed as a vehicle, for example as a highly or fully automated passenger car, as a highly or fully automated transport vehicle or as a highly or fully automated truck. Also, the robots may be industrial robots, automated lawn mowers, vacuum robots, mopping robots or automated watercraft.

The vehicle 1 comprises a lidar 2 with at least one lidar sensor 2.1 and a camera 3, wherein the lidar 2 and the camera 3 are designed to capture a vehicle environment.

The device 4 comprises the lidar 2, the camera 3, and a processing unit 5.

The aim of the calibration is to calibrate the camera 3 relative to the lidar sensor 2.1 in such a way that any differences between optical axes of the camera 3 and the lidar sensor 2.1, i.e., azimuth and elevation errors, are equalized, so that the camera 3 and the lidar sensor 2.1 see the same object at the same location.

For this purpose, a virtual plane $E_v$ is defined in front of the vehicle 1, which is located in the detection range of the camera 3 and the lidar sensor 2.1. By means of the lidar sensor 2.1, infrared laser radiation is emitted and thus the virtual pattern $M_v$ is generated on the virtual plane $E_v$. The virtual pattern $M_v$ is, for example, a chessboard pattern. The virtual pattern $M_v$ is generated here in a coordinate system of the lidar sensor 2.1. The infrared laser radiation penetrates the virtual plane $E_v$, so that a real pattern $M_r$ correlating with the virtual pattern $M_v$ is projected onto a projection surface A in the vehicle environment, for example onto a road surface. This projected real pattern $M_r$ is distorted compared to the virtual pattern $M_v$ because the projection surface A on which the real pattern $M_r$ arises is not plane-parallel to the virtual plane $E_v$.

In a possible embodiment, the lidar 2 or the lidar sensor 2.1 has a rotating mirror with which the infrared laser radiation is deflected across a scene to be scanned.

By means of the lidar sensor 2.1, a distance d to individual pixels of the projected real pattern $M_r$ is determined. Thus, by means of the processing unit 5, a surface profile of the projection surface A is three-dimensionally determined, and a so-called ground truth is generated.

At least one image B of the real pattern $M_r$ is captured by means of the camera 3. Based on the determined surface profile of the projection surface A, the captured real pattern $M_r$ is rectified by means of the processing unit 5 by recalculating what it would look like on the virtual plane $E_v$. The result of this recalculation is a rectified virtual pattern $M_{ev}$ recalculated in the coordinate system of the camera 3.

Since synchronization fluctuations of the rotating mirror of the lidar 2 can cause distances between the lines of the virtual pattern $M_v$ and therefore distances between lines of the real pattern $M_r$ to vary, in order to compensate for these errors upon capturing the real pattern $M_r$, in a possible embodiment an integration is carried out across several images B of the camera 3. This integration also increases the resolution of the camera 3 in the infrared range, which is advantageous because a camera 3 designed as a conventional color camera is most highly sensitive in the visible light range and has a rather low sensitivity in the infrared range.

In a further possible embodiment, the camera 3 is switched to a calibration mode for calibration. Furthermore, it is possible for the camera 3 to have an infrared light filter to reduce interference and/or to increase a color quality. This infrared light filter is designed, for example, in such a way that it is either transparent for the reflected IR laser pulses, or, that in the calibration mode of the camera 3, it can be switched to a transparent state for the infrared laser radiation of the lidar sensor 2.1.

Due to an azimuth and elevation error, the coordinate system of the lidar sensor 2.1 is shifted and rotated relative to the coordinate system of the camera 3. Therefore, the two virtual patterns $M_v$, $M_{ev}$ are also shifted and rotated against one another.

From the two virtual patterns $M_v$, $M_{ev}$, transformation equations are determined for converting one virtual pattern $M_v$, $M_{ev}$ into the other virtual pattern $M_{ev}$, $M_v$. This means that transformation parameters P of a coordinate transformation are determined, with which the data captured by the camera 3 can be transformed into the coordinate system of the lidar sensor 2.1, or with which the data captured by the lidar sensor 2.1 can be transformed into the coordinate system of the camera 3.

With the determined transformation parameters P, the environment data determined by the lidar sensor 2.1 or the camera 3 is then transformed into the coordinate system of the respective other sensor during regular operation. The lidar sensor 2.1 and the camera 3 then see the same object at the same location.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for calibrating a camera or a lidar sensor of a vehicle or robot, the method comprising:
    projecting, by the lidar sensor onto a virtual plane in an environment of the vehicle or robot, a virtual pattern generated in a coordinate system of the lidar sensor, wherein laser radiation emitted by the lidar sensor penetrates the virtual plane and is projected on a real projection surface as a real pattern, wherein the virtual plane and the real projection surface are not plane-parallel;
    capturing, by the camera, the real pattern projected on the real projection surface;
    recalculating the captured real pattern on the real projection surface onto the virtual plane based on a surface profile of the real projection surface;
    generating, based on the recalculated real pattern, a rectified virtual pattern in a coordinate system of the camera; and
    calibrating the camera or the lidar sensor based on a comparison of the virtual pattern and the rectified virtual pattern.

2. The method of claim 1, wherein the surface profile of the real projection surface is determined by the lidar sensor based on distances to pixels of the real pattern.

3. The method of claim 1, wherein the comparison of the virtual pattern and the rectified virtual pattern involves determining at least one transformation equation for converting the virtual pattern into the rectified virtual pattern or for converting the rectified virtual pattern into the virtual pattern.

4. The method of claim 1, wherein the calibration further comprises determining an azimuth error or elevation error of the camera or of the lidar sensor.

5. The method of claim 1, wherein the generation of the virtual pattern, involves the laser radiation emitted by the lidar sensor being deflected by a rotating mirror of the lidar sensor.

6. The method of claim 1, wherein, during the capture of the real pattern by the camera, an integration is performed across several successively captured images of the camera.

7. The method of claim 1, wherein calibrating the camera further comprises switching the camera to a calibration mode.

8. The method of claim 1, wherein the virtual pattern is projected by infrared laser radiation.

9. The method of claim 1, wherein the images captured by the camera of the environment of the vehicle or robot are captured while light radiation hitting the camera is filtered by a camera-internal infrared light filter.

10. The method of claim 9, wherein the camera-internal infrared light filter is
    transparent to infrared laser radiation emitted by the lidar sensor and reflected by the real projection surface, or
    switched to be transparent in a calibration mode of the camera for infrared laser radiation emitted by the lidar sensor and reflected by the real projection surface.

* * * * *